US007689856B2

(12) United States Patent
Godiwala

(10) Patent No.: US 7,689,856 B2
(45) Date of Patent: Mar. 30, 2010

(54) MESOCHRONOUS CLOCK SYSTEM AND METHOD TO MINIMIZE LATENCY AND BUFFER REQUIREMENTS FOR DATA TRANSFER IN A LARGE MULTI-PROCESSOR COMPUTING SYSTEM

(75) Inventor: Nitin Godiwala, Boylston, MA (US)

(73) Assignee: SiCortex, Inc., Maynard, MA (US)

( * ) Notice: Subject to any disclaimer, the term of this patent is extended or adjusted under 35 U.S.C. 154(b) by 812 days.

(21) Appl. No.: 11/594,442

(22) Filed: Nov. 8, 2006

(65) Prior Publication Data

US 2008/0109671 A1 May 8, 2008

(51) Int. Cl.
*G06F 1/00* (2006.01)
*G06F 1/04* (2006.01)
*G06F 1/12* (2006.01)

(52) U.S. Cl. ............... 713/600; 713/400; 713/500; 710/61

(58) Field of Classification Search ............ 713/400, 713/500, 501, 502, 503; 710/61
See application file for complete search history.

(56) References Cited

U.S. PATENT DOCUMENTS 5,838,749 A    11/1998  Casper et al.

| 6,987,823 | B1 | 1/2006 | Stark et al. |
|---|---|---|---|
| 7,474,612 | B1* | 1/2009 | Patel ................. 370/217 |
| 2005/0069071 | A1* | 3/2005 | Kim et al. ............ 375/355 |
| 2005/0276322 | A1 | 12/2005 | Best |
| 2005/0286507 | A1* | 12/2005 | Sterling et al. ......... 370/363 |
| 2006/0092969 | A1 | 5/2006 | Susnow et al. |

OTHER PUBLICATIONS

International Search Report Corresponding to International Application No. PCT/US07/82859, mailed May 7, 2008.

* cited by examiner

*Primary Examiner*—Mark Connolly
(74) *Attorney, Agent, or Firm*—Chapin IP Law, LLC; Barry W. Chapin, Esq.

(57) ABSTRACT

A mesochronous clock system and method to minimize latency and buffer requirements for data transfer in a large multiprocessor computing system. A stream of data is transferred from a first clock domain with a first clock signal to a second clock domain with a second clock signal. The first and second clock signals have a mesochronous relationship. The first clock signal is sampled in the second clock domain. In response to the sampling of the first clock signal, a modified version of the first clock signal is formed having a known phase relationship to the second clock signal. A parallel form of the received data is formed under the control of modified version of the first clock signal. In response to the sampling of the first clock signal, a subset of contiguous bits of the parallel data is selected for use in the second clock domain.

3 Claims, 8 Drawing Sheets

MESOCHRONOUS CLOCK SYSTEM AND METHOD TO MINIMIZE LATENCY AND BUFFER REQUIREMENTS FOR DATA TRANSFER IN A LARGE MULTI-PROCESSOR COMPUTING SYSTEM

CROSS-REFERENCE TO RELATED APPLICATIONS

This application is related to the following U.S. patent applications, the contents of which are incorporated herein in their entirety by reference:

U.S. patent application Ser. No. 11/335,421, filed Jan. 19, 2006, entitled SYSTEM AND METHOD OF MULTI-CORE CACHE COHERENCY;

U.S. patent application Ser. No. 11/594,416, filed on an even date herewith, entitled COMPUTER SYSTEM AND METHOD USING EFFICIENT MODULE AND BACKPLANE TILING TO INTERCONNECT COMPUTER NODES VIA A KAUTZ-LIKE DIGRAPH;

U.S. patent application Ser. No. 11/594,426, filed on an even date herewith, entitled SYSTEM AND METHOD FOR PREVENTING DEADLOCK IN RICHLY-CONNECTED MULTI-PROCESSOR COMPUTER SYSTEM USING DYNAMIC ASSIGNMENT OF VIRTUAL CHANNELS;

U.S. patent application Ser. No. 11/594,421, filed on an even date herewith, entitled LARGE SCALE MULTI-PROCESSOR SYSTEM WITH A LINK-LEVEL INTERCONNECT PROVIDING IN-ORDER PACKET DELIVERY;

U.S. patent application Ser. No. 11/594,427, filed on an even date herewith, entitled REMOTE DMA SYSTEMS AND METHODS FOR SUPPORTING SYNCHRONIZATION OF DISTRIBUTED PROCESSES IN A MULTIPROCESSOR SYSTEM USING COLLECTIVE OPERATIONS;

U.S. patent application Ser. No. 11/594,423, filed on an even date herewith, entitled COMPUTER SYSTEM AND METHOD USING A KAUTZ-LIKE DIGRAPH TO INTERCONNECT COMPUTER NODES AND HAVING CONTROL BACK CHANNEL BETWEEN NODES;

U.S. patent application Ser. No. 11/594,420, filed on an even date herewith, entitled SYSTEM AND METHOD FOR ARBITRATION FOR VIRTUAL CHANNELS TO PREVENT LIVELOCK IN A RICHLY-CONNECTED MULTI-PROCESSOR COMPUTER SYSTEM;

U.S. patent application Ser. No. 11/594,441, filed on an even date herewith, entitled LARGE SCALE COMPUTING SYSTEM WITH MULTI-LANE MESOCHRONOUS DATA TRANSFERS AMONG COMPUTER NODES;

U.S. patent application Ser. No. 11/594,405, filed on an even date herewith, entitled SYSTEM AND METHOD FOR COMMUNICATING ON A RICHLY CONNECTED MULTI-PROCESSOR COMPUTER SYSTEM USING A POOL OF BUFFERS FOR DYNAMIC ASSOCIATION WITH A VIRTUAL CHANNEL;

U.S. patent application Ser. No. 11/594,443, filed on an even date herewith, entitled RDMA SYSTEMS AND METHODS FOR SENDING COMMANDS FROM A SOURCE NODE TO A TARGET NODE FOR LOCAL EXECUTION OF COMMANDS AT THE TARGET NODE;

U.S. patent application Ser. No. 11/594,447, filed on an even date herewith, entitled SYSTEMS AND METHODS FOR REMOTE DIRECT MEMORY ACCESS TO PROCESSOR CACHES FOR RDMA READS AND WRITES; and U.S. patent application Ser. No. 11/594,446, filed on an even date herewith, entitled SYSTEM AND METHOD FOR REMOTE DIRECT MEMORY ACCESS WITHOUT PAGE LOCKING BY THE OPERATING SYSTEM.

BACKGROUND

1. Field of the Invention

The present invention relates generally to mesochronous clock architectures and, more specifically, to a mesochronous clock architecture for use in a large-scale computing system to reduce latency and buffer requirements involved with data transfers among computing nodes.

2. Discussion of Related Art

Synchronous clock architectures use a clock signal to control data transfers among subsystems or circuits. These architectures require the clock signals to have identical frequency and to be aligned in phase (e.g., rising edges occurring at precisely the same instant in time). They are relatively simple to implement at low frequencies and particularly well-suited for smaller systems where it is feasible and cost-effective to satisfy the necessary clocking requirements.

Asynchronous clock architectures have different clocking domains in different subsystems or circuits. Each clock domain may have a different frequency and the phase relationship among domains is unknown. These systems have relatively relaxed system requirements and thus have been used in larger systems where it has been impractical to use synchronous designs. Unfortunately, these designs typically require some form of synchronizer circuit at the boundaries of clock domains, and these add complexity and significant latency to data transfers between subsystems having different clock domains.

Mesochronous clock architectures have different clocking domains in different subsystems or circuits. The different domains, however, all have the same clock frequency, though there is no fixed phase relationship among the domains.

Typically large scale computing systems or clusters have multiple printed circuit boards (PCBs) or modules. Each module often has its own clock, or clock domain. Data transfer methods among processors in different domains have involved significant data path latency and significant buffer requirements.

Some digital systems employ serial/deserializer (SERDES) logic to implement data pipes among various nodes in the system. Typically, the SERDES lanes are designed to have higher bandwidth than needed by the receiver logic in the system to receive data on such links. This is done so that the SERDES logic may transmit special control characters, to tag data as a start of a new data sequence, during normal operation of the system. Thus, each SERDES logic system typically has something known as an "elastic buffer" to act as a synchronizer between the receiver clock and the core clock. Elasticity buffers add latency to the data transfer. Moreover, word synchronizing characters are sent periodically as part of a training sequence at the expense of what could otherwise be used as normal operation bandwidth.

SUMMARY

The invention provides a mesochronous clock system and method to minimize latency and buffer requirements for data transfer in a large multiprocessor computing system.

Under one aspect of the invention, a stream of data is transferred from a first clock domain with a first clock signal to a second clock domain with a second clock signal. The first and second clock signals have a mesochronous relationship. The first clock signal is sampled in the second clock domain. In response to the sampling of the first clock signal, a modified version of the first clock signal is formed in which the modified version of the first clock signal has a known phase relationship to the second clock signal. A parallel form of the received data is formed under the control of modified version of the first clock signal. In response to the sampling of the first clock signal, a subset of contiguous bits of the parallel data is selected for use in the second clock domain.

Under another aspect of the invention, the received data and the first clock are embedded in an input signal and the data and first clock signal are extracted from the input signal.

Under another aspect of the invention, the first clock signal is sampled with a flip flop and the first clock is modified in increments of the frequency of the clock signal embedded in the input signal.

DETAILED DESCRIPTION

Preferred embodiments of the invention provide a clock system and method for large systems that require data transfers among a large number of modules, nodes, or processors. The clock system is a highly reliable, mesochronous architecture. Data transfers among subsystems in different clock domains have low-latency and require minimal buffering. Preferred embodiments facilitate multi-lane data transmissions at high transfer rates among multiple clock domains.

The incorporated patent applications describe an exemplary system on which preferred embodiments of the invention may be utilized. Specifically, those applications describe a large scale computing system having hundreds of computing nodes or more (e.g., 972) and thousands of computer processors (e.g., 5832). The nodes are interconnected via a Kautz topology and divided among dozens of modules (e.g., 36). The interconnect is very high speed. Naturally embodiments of the invention may be utilized in many other designs, and reference is made to this example only to provide but one concrete context in which embodiments of the invention may be utilized.

Figure 1A:
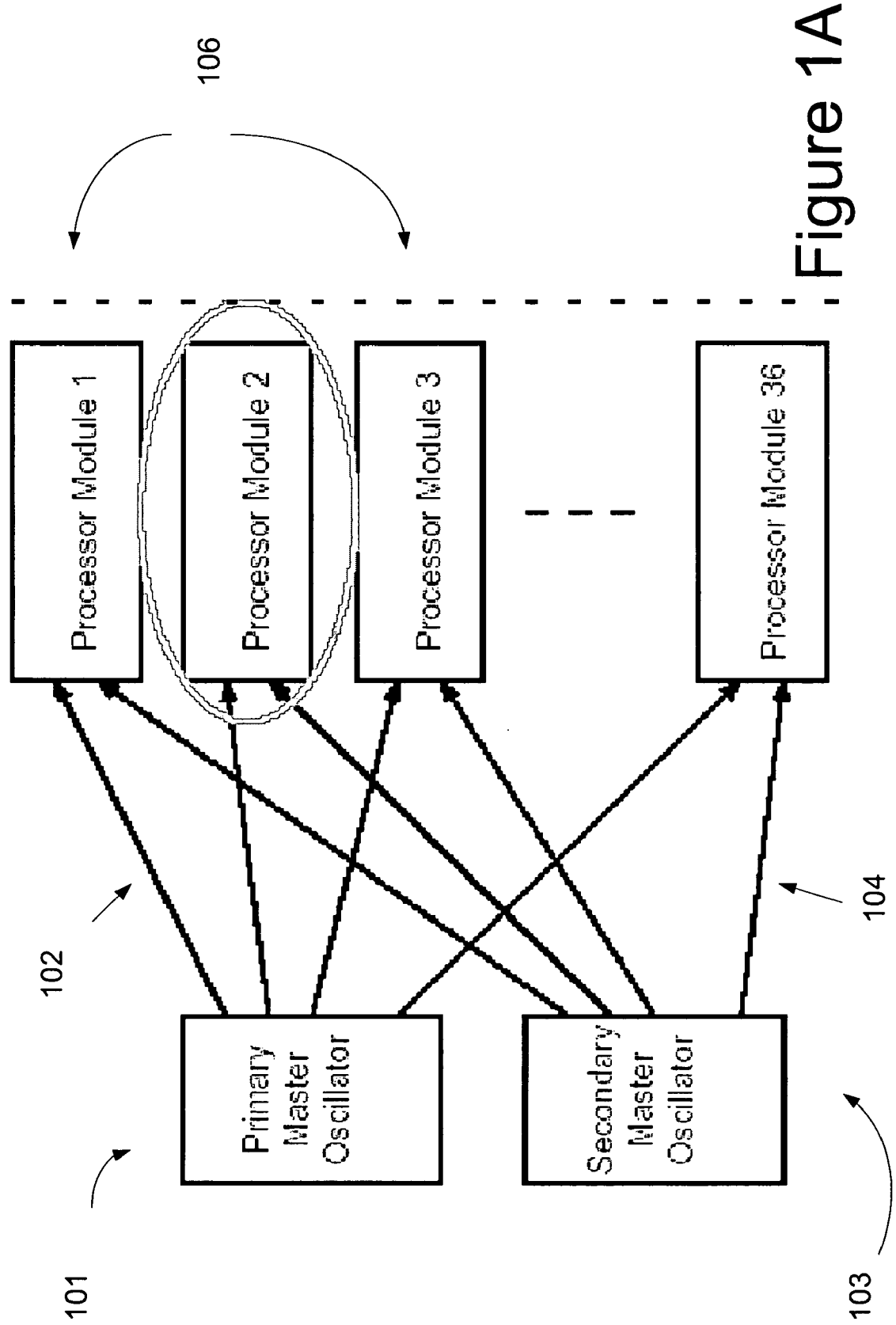
FIGS. 1A-C depict a clock distribution according to certain embodiments of the invention.
Figure 1B:
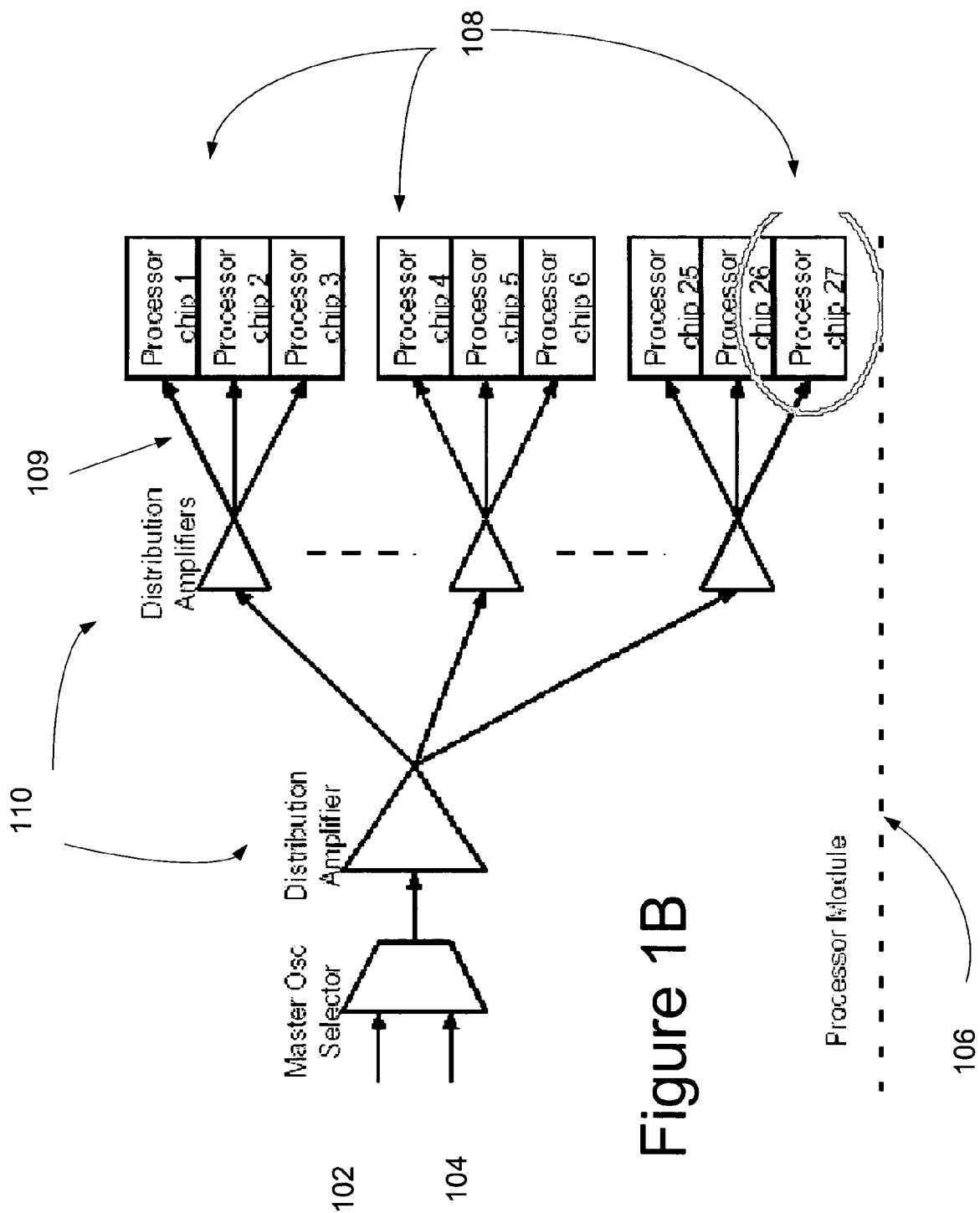
Figure 1C:
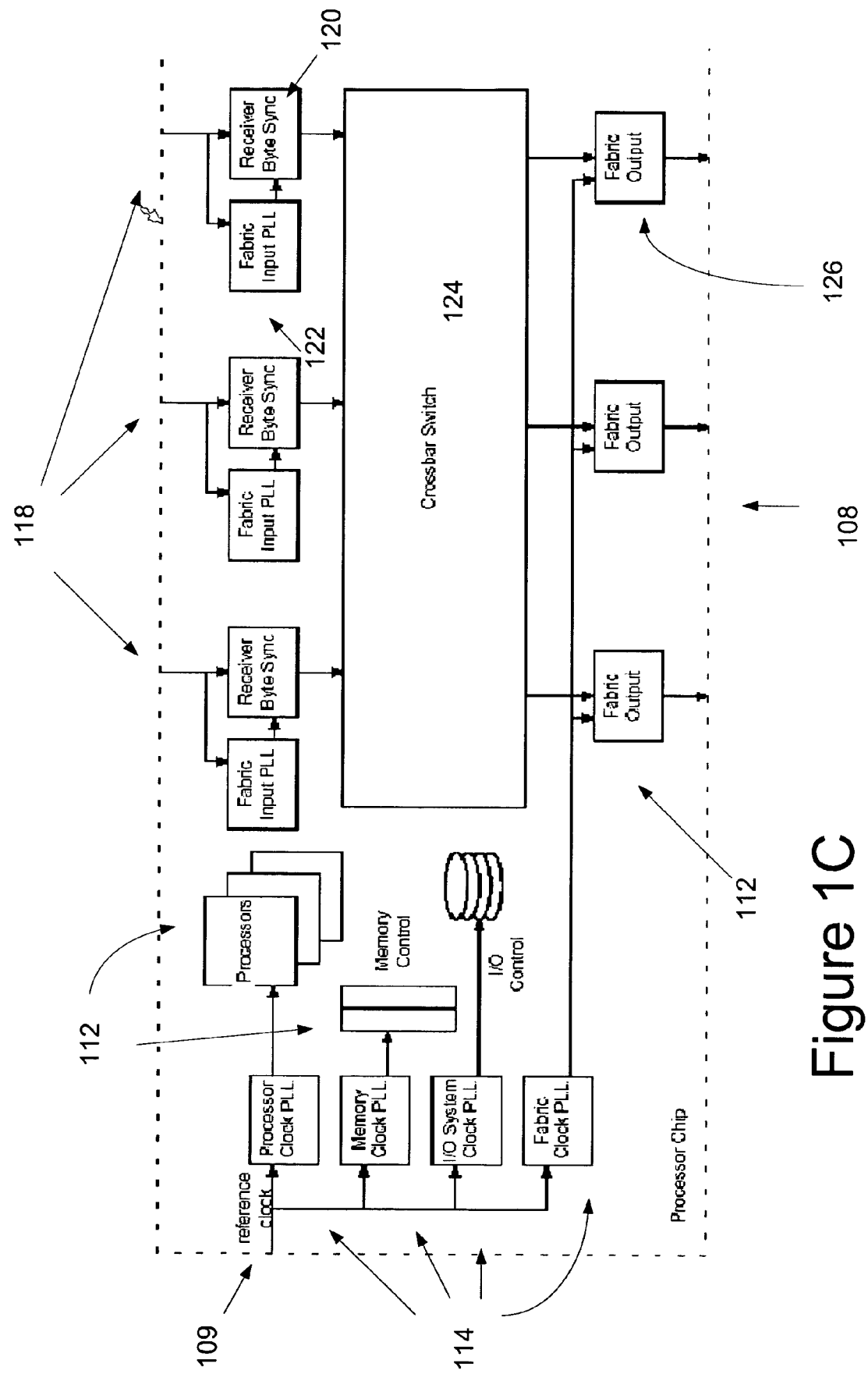

FIGS. 1A-C are high level diagrams showing a clock distribution scheme of certain embodiments of the invention. A low frequency oscillator 101 provides a master clock 102 to all modules 106. In a 972 node Kautz topology of certain embodiments, there may be 36 modules (with 27 nodes per module). A secondary clock 103 is also shown providing redundant clock 104. A single clock source ensures all modules have a fixed, known precise frequency clock. Certain embodiments use a master clock having a frequency of 66.67 MHz.

This single clock is the system clock (sysclk) and, as will be explained below, is used to derive many other clocks in the system, each of which will have its frequency (though not its phase) locked to the system clock. The fact that the frequencies are locked though the phase relationship is indeterminate characterizes the clock system as a mesochronous architecture.

FIG. 1B shows sysclk being distributed on a particular module 106. In the above exemplary computing system, sysclk would be distributed to each of 27 nodes 108 on module 106. The module uses a fanout structures 110, having distribution amplifiers. Thus, each node 108 receives an instance 109 of sysclk which will have a locked frequency relative to one another but with probable phase differences.

FIG. 1C shows, in part, the distribution of an instance 109 of sysclk within a node 108. In this example, there are various subsystems that receive the sysclk instance 109, including processors, memory, input/output (I/O), etc. (The cross bar switch logic 124 operates under the control of a synchronous clock, sclk, though the clock connection is not shown.) Each subsystem 112 has a corresponding phase lock loop (PLL) block 114 to derive a clock for the subsystem from the sysclk instance 109. Because all PLLs 114 are sourced by the same sysclk instance (or a signal derived from such), they all have a fixed frequency relationship relative to one another.

In an exemplary embodiment, ingress links 118 come from other nodes and thus other clocking domains. (Note the receiver logic connected to input links 118 do not use clocks derived from that instance of sclk). In certain embodiments the links are serial using an 8B/10B code (e.g., IEEE 802.3) with embedded clocks and data on the link signals. In certain embodiments, each link 118 has 8 differential pairs (lanes) of lines to receive data from a parent node, and one differential pair to provide control and status information to a parent or upstream node. (The control lane is not shown in these figures, but is shown in other incorporated patent applications.)

Each receiver block 120 is connected to an ingress link 118 and operates autonomously (i.e., not under the control of sclk of the local node) to recover the data and clock from the signals on links 118, and to provide the data (in deserialized form) to crossbar switch logic 124. For example, each lane is used to provide 8 bits of data at a time (via 8B/10B code) and there are eight lanes in each link. Thus, in certain embodiments, data is provided on a link 118 in 64 bit chunks or fabric words.

The receiver block (as will be explained further below) is responsible for acquiring "lane framing" information on all data lanes of a link, so that the data on each lane may be properly deciphered. It is also responsible for acquiring "word framing" information so that the information serially received on the eight data lanes may be properly coordinated into data (e.g., words) that is usable by the node. It is also responsible for acquiring synchronization of the link so that data received on the link (from one clock domain, i.e., related to the parent node that transmitted the data) may be transferred to the local node, which operates in a different clock domain (mesochronously-related). It is also responsible for monitoring the fabric to detect errors and to monitor and test for the loss of link synchronization and to perform re-synchronization if needed.

The receiver block 120 deserializes the data embedded in the signal of a given lane at the rate of fclk (i.e., the clock rate embedded in the signal on input fabric link 118). In certain embodiments the link operates at 1 GHz, with data encoded on both clock edges. It collects 10 bits of data (recovered from the signal on a lane) and forwards a recovered version of the clock (rxclk) and the 10 bits of data onward (more below). The rxclk is 5 times slower than fclk, and is the same rate as sclk at which the cross bar logic 124 operates (e.g., fclk operates at 1 Ghz, and sclk operates at 200 Mhz). The rxclk thus has the same exact frequency as sclk (both being exactly 5 times slower than fclk) but they have an unknown phase relationship relative to one another.

To provide data from the receiver block 120 to the cross bar logic 124, the rxclk and sclk clock signals must be aligned. In preferred embodiments, an alignment procedure and system is invoked after the relevant PLLs throughout the system (i.e., those generating the sclks and rxclks) are stable and locked. Data transfers between the different clock domains of sclk and rxclk are ignored until the alignment procedure is completed.

In certain embodiments, the alignment procedure moves or shifts the recovered rxclk signal. This is done so that data may be transferred synchronously into the sclk domain, without the need for elasticity buffers or synchronizer chains.

Figure 2:
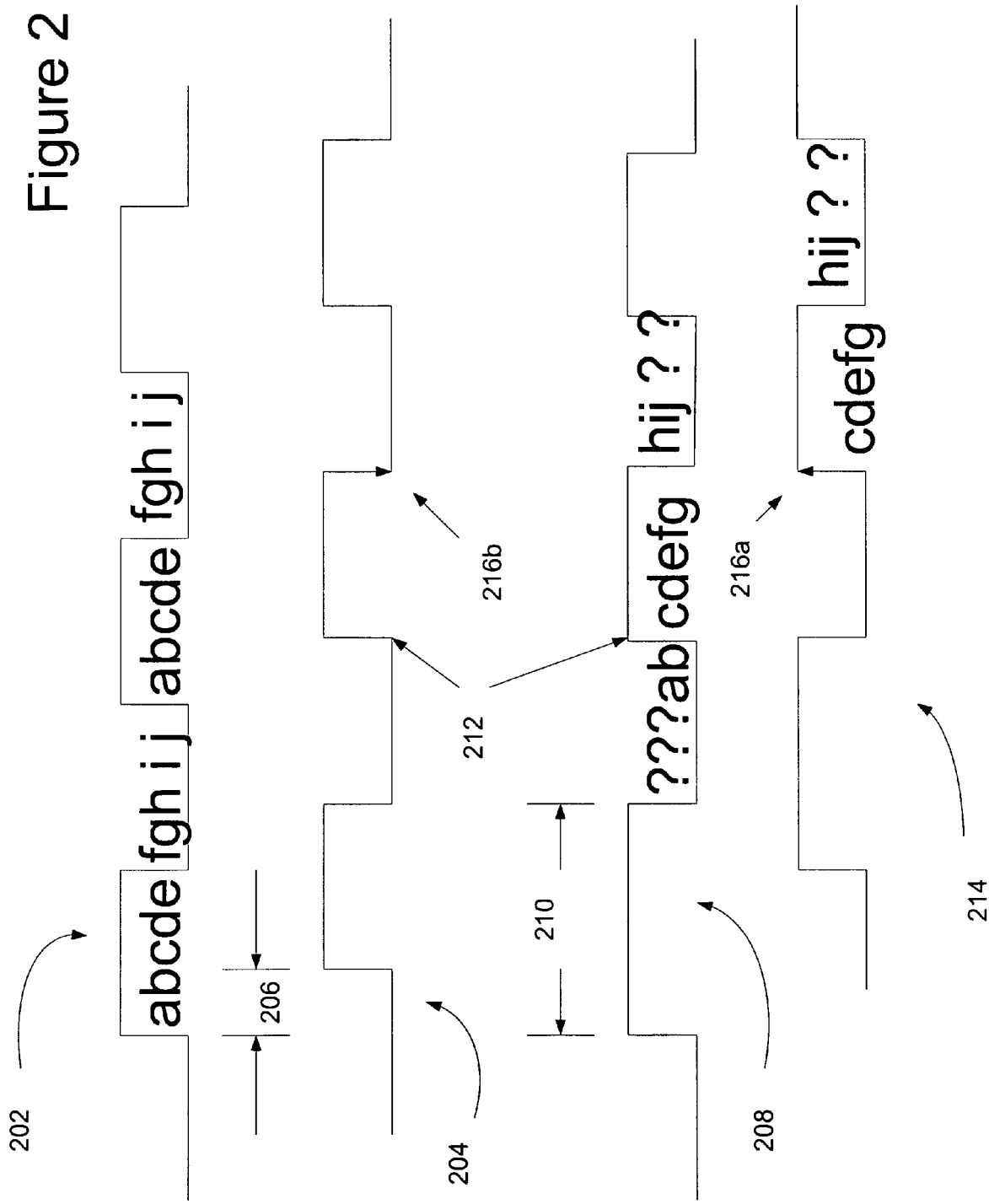
FIG. 2 depicts clock wave forms according to certain embodiments of the invention.

FIG. 2 illustrates at a high-level the alignment procedure of certain embodiments. Clock waveform 202 shows a recovered receive clock rxclk. Clock waveform 204 shows the sclk. Notice that rxclk and sclk have identical clock periods or frequencies, but they have a phase difference 206 between them. Before the alignment procedure is started this phase difference is unknown.

Clock waveform 208 depicts a modified version of the rxclk. Notices that one portion 210 of a clock waveform has been modified, in this case lengthened or stretched. The stretching procedure is done until the rising edge (could be any edge) of clock waveform 208 aligns with a rising edge of sclk. This is shown at 212. In certain embodiments, the modified rxclk 208 is then further shifted to form waveform 214 so that its subsequent rising edges are aligned with the falling edges of sclk. This is shown at 216a and 216b. This enhances stability by providing margin for the alignment procedure (more below). From that edge onward the clock edges are aligned and the modified rxclk 208 is synchronous with sclk. That is, their frequency is identical and their phase relation is precise and known so that synchronous data transfers may be made with circuitry clocked in either of these clock domains.

FIG. 2 also depicts symbols that are embedded in the received signal. For the timing of rxclk 202, the symbols transmitted are "abcde" on one phase, and "fghij" on the other. (Each character, e.g., 'a', is intended to represent a symbol.) These symbols occur at 10 times the rate of sclk and occur on both phases of the waveform; thus they are shown as depicted with 5 symbols in each phase of the clock waveform. To illustrate the principle, the symbols are repeated to show the effect of stretching the clock as shown. Waveform 208, i.e., the stretched rxclk, has lost the symbols "ab" as a result of shifting the clock as shown. As will be explained below, this loss is addressed by keeping a window of old and new symbols received.

Figure 3:
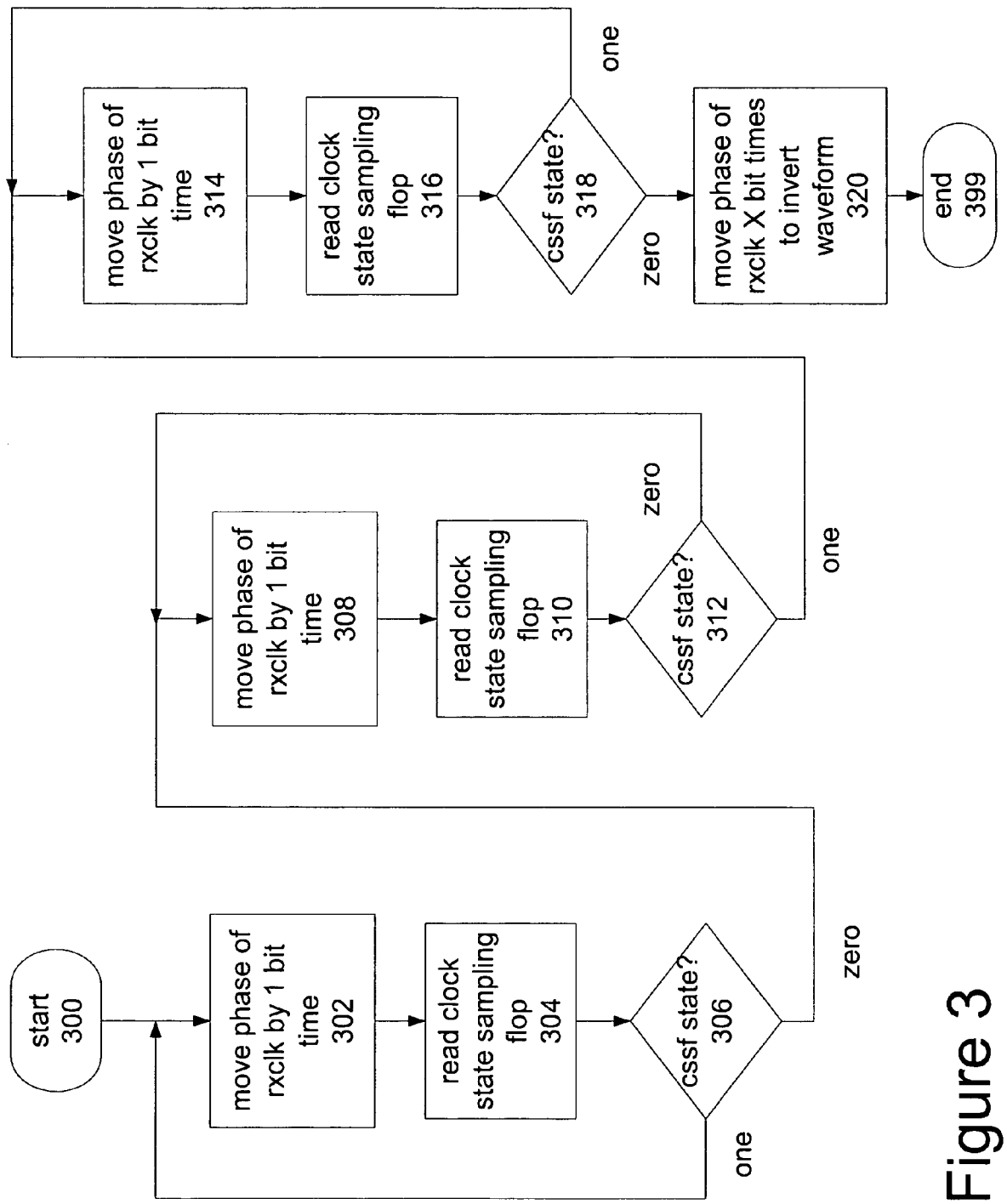
FIG. 3 is flow chart depicting the logic flow for controlling data transfers according to certain embodiments of the invention.

FIG. 3 depicts the clock alignment procedure of certain embodiments. It should be consulted in conjunction with FIG. 2. This procedure is implemented in the sclk domain and it first aligns the rising edge (sampling edge) of a modified rxclk with the rising edge (sampling edge) of sclk, and then shifts the modified clock to provide adequate margin of error (and thus reliability) in the procedure.

The logic starts in step 300 and proceeds to steps 302-306 where the rxclk is moved one-bit time repeatedly, until a clock state sampling flop (CSSF) samples a zero, at which point the procedure moves to step 308. The logic then performs a similar iteration with steps 308-312, moving the rxclk one-bit time repeatedly, until the CSSF latch samples a one, at which point the logic proceeds to step 314. At this point, the logic has moved, or modified, the rxclk to find the rising edge of rxclk, by first identifying a zero and then identifying the transition to a one logical value on rxclk. This edge is as sampled by the sclck. So at this point, the modified rclk rises at the same instant in time (within a range of error defined by the amount of clock shifting, e.g., 1 fclk) as the sclk sampling edge used to control the CSSF. Steps 314-318 perform a similar search moving the rxclk until the transition to zero has again been detected. Once detected, the logic proceeds to step 320 where the rxclk is again moved a sufficient number of bit times (which depend on the relevant clock) to invert the waveform. In an embodiment where the fclk is five times the sclk, this would correspond to five bit shifts of rxclk. The logic then ends in step 399. (In other embodiments, steps 314-318 are avoided.)

The above procedure will provide a modified version of the rxclk to permit subsequent synchronous data transfers, i.e. data transmitted in the rxclk domain, can be transferred to the sclk domain without the need for synchronizer chains or elasticity buffers (and the cost and latency involved with such).

Figure 4:
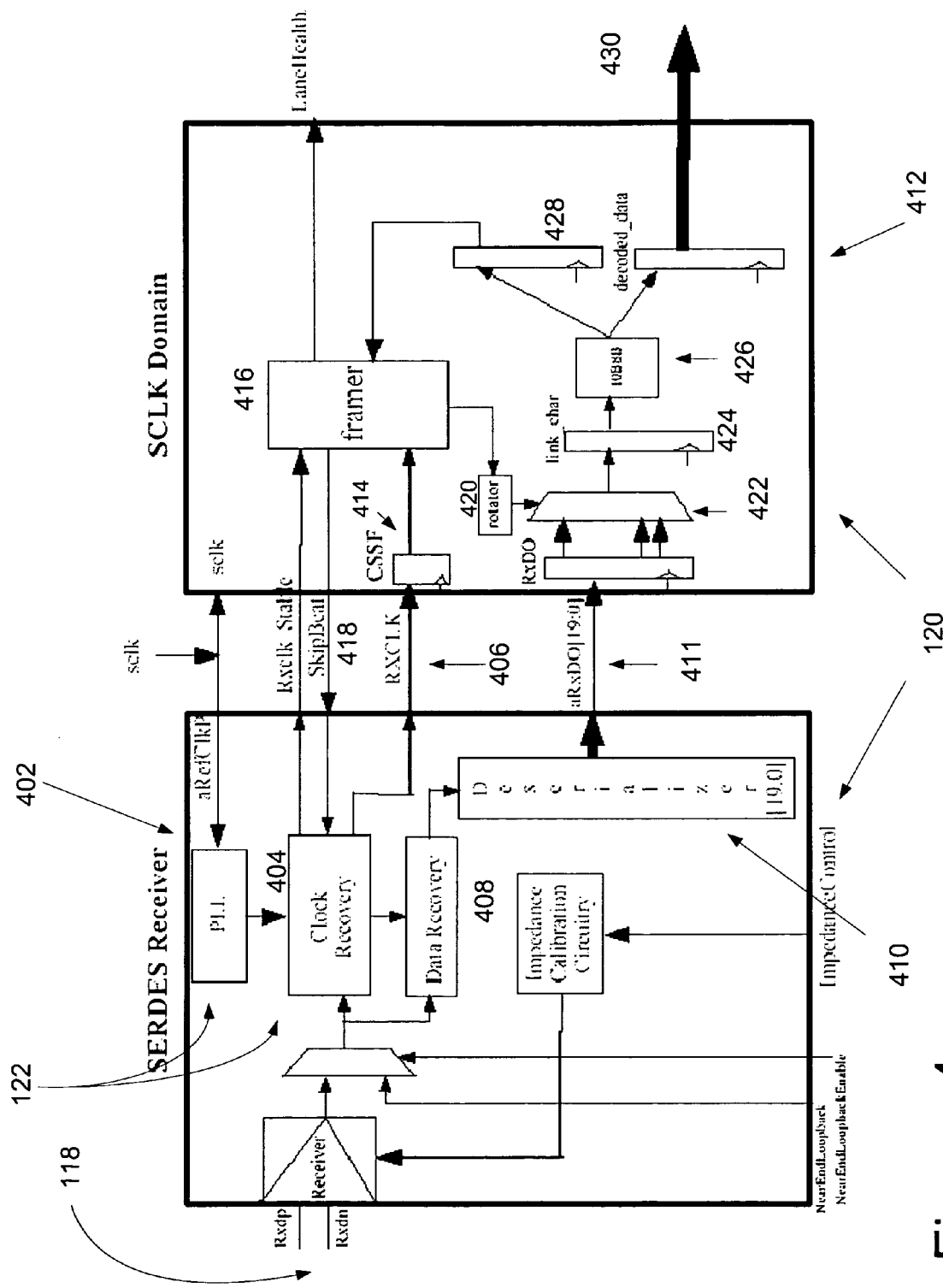
FIG. 4 depicts data transfer logic according to certain embodiments of the invention.

FIG. 4 shows the circuitry of a preferred embodiment that may be used for both the clock alignment and to re-align the data to make the data consistent with clock edges. Certain embodiments of the invention include SERDES receiver 402 and symbol or lane framing logic 412.

The SERDES logic 402 receives a signal from input link 118. As mentioned above, this signal may be a very high speed signal with 8B/10B codes. The logic 402 recovers and separates the data and clock from this signal in the fclk domain, i.e., the domain of the signal as transmitted by the sender node that transmitted the signal on link 118. Thus, this block is receiving the clock and embedded data illustrated with waveform 202 of FIG. 2. Logic 402 includes clock recovery circuit 404 for recovering the embedded clock in the signal and also for stretching the clock as described above to provide a potentially modified version of the rxclk. The potentially modified version of the clock is shown as rxclk 406. The logic 408 also includes data recovery circuit 408 and deserializer block 410. The data recovery circuit is responsible for extracting the symbols embedded in the signal. With reference to FIG. 2, these would be "abcde . . . ." Deserializer block 410 receives these recovered symbols in serial form (as they are recovered) and positions them for subsequent parallel transfer. (Deserializer 410 is controlled by the recovered fclk.) In certain embodiments the deserializer keeps a window of 20 symbols, depicted as aRxDO [19:0]. This data is provided to framing logic 412 via bus 411. All logic in SERDES 402 operates in the fclk domain. In certain embodiments the SERDES logic is available from Analog Bits, Inc. The deserializer shifting input runs from a recovered fclk. That data transfers to RxDO on Rxclk (not shown in diagram).

Rxclk is used for the RxDO register and CSSF. The link char register (424) is clocked by Sclk.

The symbol or lane framing logic 412 is responsible for adjusting the relevant clocks (e.g., rxclk) and for framing the symbols embedded in the signal. In this fashion, data may be transferred in a synchronous manner without the need for synchronizer chains or elasticity buffers.

To adjust clocks, the framing logic 412 includes a clock state sampling flop 414. The rxclk signal 406 is received on the D input of CSSF 412 as if it were a data input. The CSSF is controlled by a sclk to latch the input (sclk latching not shown). Because the relationship between signal 406 and sclk is unknown, the CSSF must be given sufficient time to resolve to address metastability issues and the like. The CSSF 412 thus samples the value of the rxclk signal 406. Initially, this is the signal as recovered from the signal on links 118. Framer state logic 416 includes state machine logic to implement the procedure of FIG. 3, and consequently, in response to receiving the signal from CSSF 412 issues a skip beat signal 418 to the SERDES logic 402. This causes the clock recovery circuit 404 to stretch the rxclk signal 406. This is performed repeatedly until the signal 406 is modified as described above in connection with FIGS. 2 and 3.

With reference to FIG. 2, the rising edge of rclk (the original one) corresponded with symbol 'a' followed by a symbol 'b'. As shown in FIG. 2, when rxclk is shifted (i.e., corresponding to signal 406), the rising edge of the modified rxclk now corresponds with symbol 'c', not symbol 'a' as originally sent. To address this, the deserializer 410 keeps 20 symbols, not 10. Moreover, those 20 bits are transferred to the sclk domain by bus 411. State logic 416 provides control signals to mux control 420, which controls mux 420 to select out the relevant 10 symbols from the window of 20. So with reference to FIG. 2, if the situation were as depicted, the mux control would instruct the mux to select the last 2 symbols from the prior sclk cycle (to capture 'a' and 'b') and then to select the 8 bits of the current cycle to capture the remaining 8 symbols. Thus, latch 424 will have the 20 symbols corresponding to the fclk cycle a-j. This 10 symbol collection is then used to consult code table 426 which will decode the received stream with the relevant standard being employed (e.g., 10B/8B). This will then provide, in certain embodiments, 8 bits of data, synchronous to sclk domain, on line 430. The decoded data, in certain embodiments, is also provided to latch 428 and then to framer state logic 416. For 10-bit encoded data there are only 10 possible framing boundaries. The framer forms 10 possible character strings of the incoming data stream and uses a mux and rotator to select each possible string. The framer state logic 416 tests if valid characters are received for a predetermined number of cycles to validate the corresponding framing boundary. If valid characters are not received, the rotator is incremented to test and validate a different framing boundary; this is repeated until a valid boundary is identified.

Once the above procedure is implemented, the 20 symbols of data 411 may be transferred to the sclk domain, and the relevant 10 symbols selected to correspond to the rising edge of rxclk. Thus, the transfer will operate as a 10 symbol synchronous transfer to the sclk domain, but no synchronizer chains or elasticity buffers are needed.

As explained above, however, this is for just one data lane, and certain embodiments provide multiple data lanes in parallel, e.g., 8 lanes of data between nodes. More specifically, the transmitting logic 126 (see FIG. 1C) operates synchronously relative to the cross bar logic 124 and sclk of one node (i.e., the sending node). Note it is driven by a PLL 114 that derives the subsystem clock from the same instance of sysclk as the other subsystems (other than the receiver logic). This data is driven to another node where it is received by links 118 as described above.

As explained above, the link 118 has eight separate lanes (or separate differential pairs). Data propagation delay on each lane may differ, resulting in mismatch of arrival times on each lane of link 118. With reference to FIG. 2, one lane may be as depicted, but in another lane the shifts necessary to align data may differ. A wordsync function is implemented to equalize electrical delays among the eight receiver lanes so that 8 lanes of data may operate in concert, all aligned properly to the same sampling edges of sclk.

Figure 5:
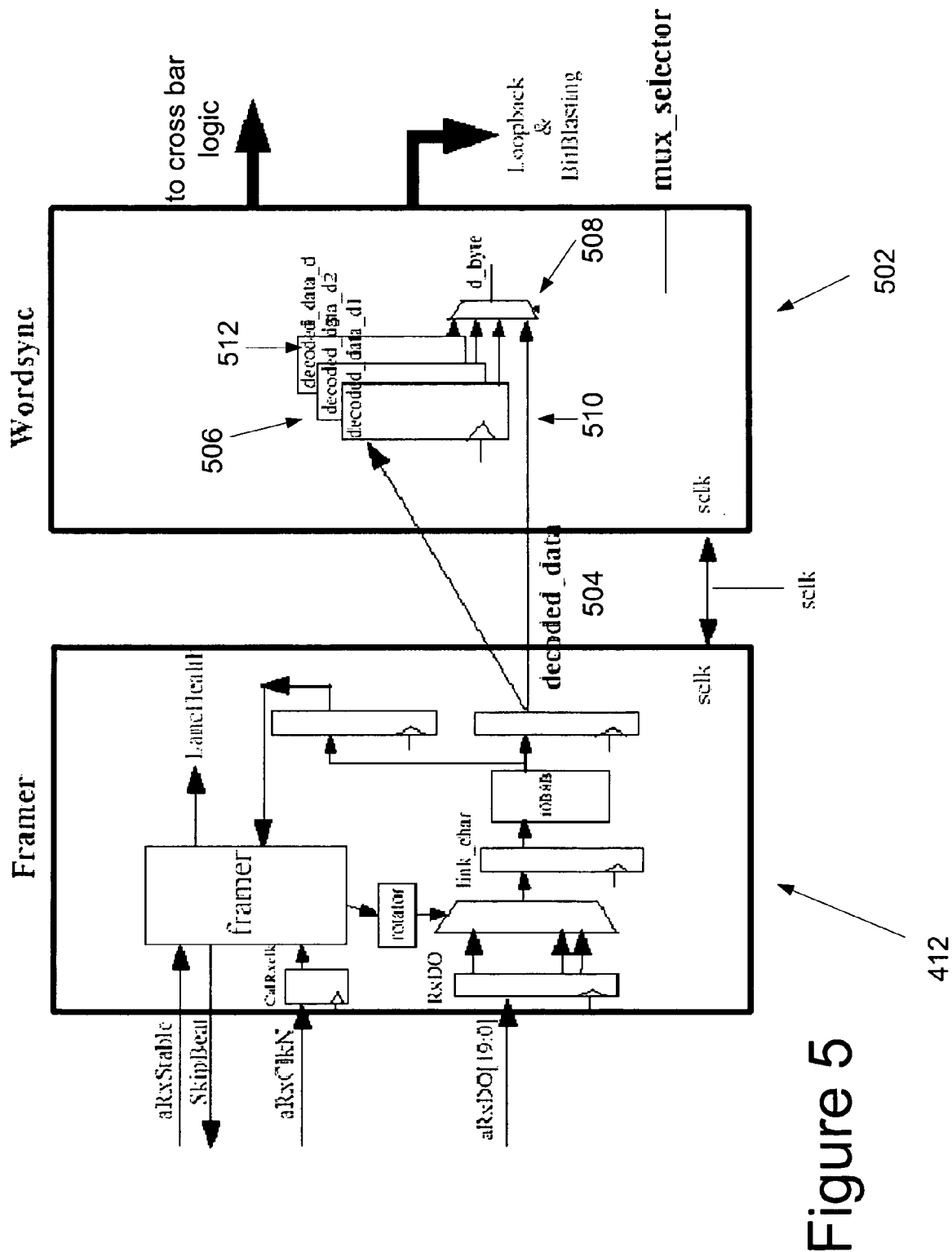
FIG. 5 depicts data transfer logic according to certain embodiments of the invention.

FIG. 5 is a block diagram showing word synchronization logic 502 coupled to the framing logic 412, previously described. Word synchronization among the eight receiver lanes is achieved in three steps. First, the propagation delays of the eight lanes are measured to determine the differences. Second, delay is added to the relatively faster lanes. Third, a validation step is performed to verify that the propagation delays of the eight lanes (as adjusted) are substantially equal. The word synchronization logic 502, in certain embodiments, has the ability to delay the received data byte 504 (i.e., the data decoded from the 8B/10B code) by one, two, or three sclk periods. The delays are done with a latching system 506 which has latch structures controlled by an sclk to provide various delayed versions of the decoded data. The delayed versions (e.g., no delay, one sclk delay, two sclk delays, or three sclk delays) in turn are provided to mux 508 so that the appropriately delayed version may be selected.

Under certain embodiments, the various nodes initially transfer control status to confirm that the SERDES logic, etc., is alive and stable and ready to perform a word synchronization function. To measure propagation delay on a lane, a special character is sent by a parent node on all eight lanes on the same rising edge of an sclk. This would be sent during an initialization and characterization stage (not normal use) by the fabric logic 126 shown in FIG. 1C but of a parent node in the interconnection topology of nodes. Initially, all lanes (FIG. 5 showing just one) are set to select the non-delayed version of decoded data, i.e., version 412. The special character is then sent (e.g., k28.1 character) on by the transmission logic 126 of a parent node on precisely the same rising edge of the transmission clock (in turn embedded in the signal received on link 118). Calibration of times is then made relative to sclk of the receiving node. For example, the lanes are compared to see if they all have the same signal. Those lanes that do not match the others for example, are adjusted to select a delayed version of the signal. The test is again run and repeated, until all receive the special character signal as detected at the output of mux 508.

The appropriate version of the decoded data is then selected for each lane to make the propagation times equal. Thus a slower lane would correspond to data lines 510 and a faster lane may be selected from the latch structure, such as data lines 512.

A validation step will then send the special character to all lanes. The arrival times will be noted. The arrival times should all be equal. If they are not, the muxes 508 are reprogrammed appropriately to select the correct data, and the system is tested again for validation.

In this fashion, word synchronization s performed by equalizing lane delays before mission critical data (normal operation) is enabled on the lanes. Thus bandwidth is not wasted during normal operation to perform word synchronization.

Figure 6:
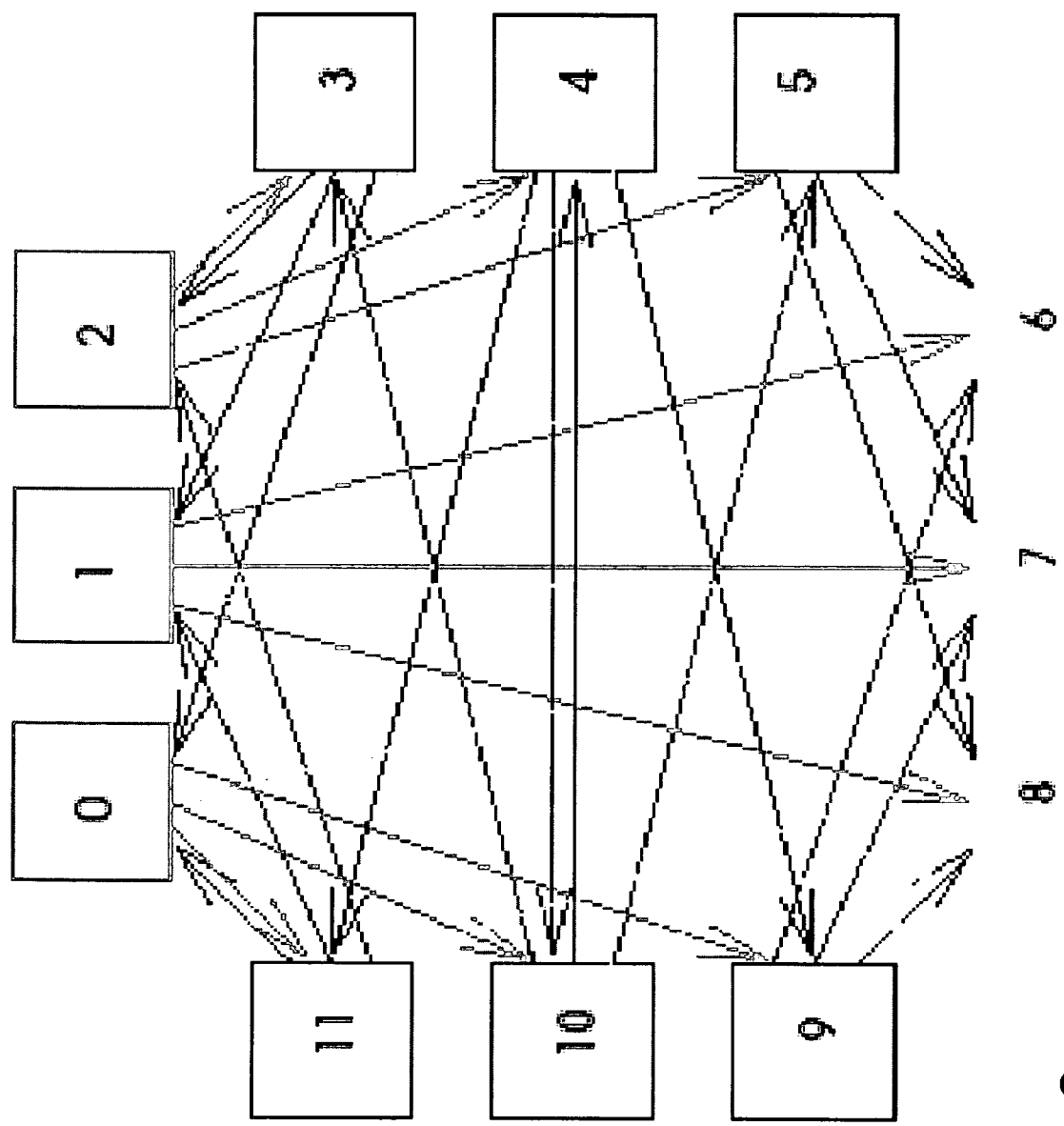
FIG. 6 depicts a processing system interconnected via a (simple) Kautz topology.

As mentioned briefly above, certain embodiments of the invention may be utilized on large scale computing systems having hundreds of computing nodes and consequently hundreds of timing domains. FIG. 6 depicts a computer system interconnect via a Kautz digraph (only data connections shown). This system has only 12 nodes and is degree three and was chosen for its simplicity to facilitate description of the embodiments (a 972 node connection scheme would be impractical and counter-productive to depict in illustration). Each node may transmit data to three other nodes as depicted and as defined by the Kautz topology. For example, node 0 may transmit data to nodes 9, 10 and 11. Each such connection, in certain embodiments, is a mesochronous transfer and is a multi-lane transfer. For example, the depicted links may each be 8 lanes wide (which may need word alignment as described above) and each lane may be 8B/10B coded meaning minimum decipherable information quanta on a link is 8 bits.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. A method of transferring a stream of data from a first clock domain with a first clock signal to a second clock domain with a second clock signal, wherein the first and second clock signals have a mesochronous relationship, the method comprising the acts of:

receiving the data stream;

sampling the first clock signal in the second clock domain;

in response to the sampling of the first clock signal, forming a modified version of the first clock signal, the modified version of the first clock signal having a known phase relationship to the second clock signal;

forming a parallel form of the received data under the control of the modified version of the first clock signal;

in response to the sampling of the first clock signal, selecting a subset of contiguous bits of the parallel data for use in the second clock domain.

2. The method of claim 1 wherein an input signal is received, wherein the received data and the first clock are embedded in the input signal, and wherein the data and first clock signal are extracted from the input signal.

3. The system of claim 2 wherein the first clock signal is sampled with a flip flop and wherein the first clock is modified in increments of the frequency of the clock signal embedded in the input signal.

* * * * *